United States Patent
Malboubi et al.

(10) Patent No.: US 12,204,675 B2
(45) Date of Patent: Jan. 21, 2025

(54) STORING DATA AT EDGES OR CLOUD STORAGE WITH HIGH SECURITY

(71) Applicant: AT&T Intellectual Property I, L.P., Atlanta, GA (US)

(72) Inventors: Mehdi Malboubi, San Ramon, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 405 days.

(21) Appl. No.: 17/498,945

(22) Filed: Oct. 12, 2021

(65) Prior Publication Data

US 2023/0111816 A1  Apr. 13, 2023

(51) Int. Cl.
  *G06F 21/62*   (2013.01)
  *G06F 16/25*   (2019.01)
  *G06F 16/27*   (2019.01)

(52) U.S. Cl.
  CPC ........ *G06F 21/6227* (2013.01); *G06F 16/258* (2019.01); *G06F 16/278* (2019.01)

(58) Field of Classification Search
  CPC .. G06F 21/6227; G06F 16/258; G06F 16/278; G06F 2221/2107; G06F 21/6245
  USPC .......................................................... 726/26
  See application file for complete search history.

(56) References Cited

U.S. PATENT DOCUMENTS

| | | | | |
|---|---|---|---|---|
| 6,424,969 B1 * | 7/2002 | Gruenwald | ........... | G06F 16/258 707/E17.058 |
| 2014/0380051 A1 * | 12/2014 | Branish, II | .......... | H04L 63/0428 713/169 |
| 2016/0026667 A1 * | 1/2016 | Mukherjee | ............ | G06F 3/0679 707/714 |
| 2016/0188694 A1 * | 6/2016 | Lehavi | .................. | G06F 16/278 707/737 |
| 2020/0134081 A1 * | 4/2020 | Ho | ......................... | G06F 16/252 |
| 2021/0124764 A1 * | 4/2021 | Kaul | ..................... | G06F 16/211 |

* cited by examiner

*Primary Examiner* — Jacob Lipman
(74) *Attorney, Agent, or Firm* — Guntin & Gust, PLC; Dana Lemoine

(57) ABSTRACT

The disclosed technology is directed towards partitioning data and distributing the data to different storage locations, which facilitates better data security. For example, a large database of source data can be partitioned into a small enabler partition and one or more large partitions, in which a full set of the partitions is needed to reconstruct the source data to its original state. The large partition can be maintained at an edge computing facility to reduce latency, or at a cloud computing facility to reduce storage expenses, with the smaller enabler partition only accessed when needed to reconstruct the data. A database is partitioned into a group of partitions, and the group of partitions is distributed to separate storage facilities. The separate storage and computing facilities/nodes are accessed to obtain datasets of the group of partitions, and merged to reconstruct the source data.

20 Claims, 12 Drawing Sheets

$$U = \begin{bmatrix} -0.1902157, 0.07774083, -0.4547332 1, 0.28961273, -0.68962326, -0.43764858 \\ -0.32717634, 0.27247734, -0.12334863, -0.76663342, 0.15763544, -0.43694523 \\ -0.59729378, 0.60466615, 0.12209345, 0.15927164, -0.08512575, 0.47968566 \\ -0.19021694, 0.01888667, -0.57957231, 0.3903793, 0.67836881, -0.12237856 \\ -0.59730895, -0.46757297, 0.50328236, 0.21945836, 0.08793855, -0.33971937 \\ -0.32719003, -0.57888697, -0.41701178, -0.32011286, -0.15622742, 0.50700937 \end{bmatrix}$$

$$S = \text{diag}([64900.68471704, 224.32797677, 179.05915275, 0.35731085])$$

$$V = \begin{bmatrix} -0.00008125, -0.99998993, -0.00397101, -0.00209107 \\ -0.00046767, 0.00437565, -0.9662538, -0.25755432 \\ -0.00133419, 0.00099786, 0.25756128, -0.96626053 \\ -0.999999, 0.00007787, 0.00010858, 0.001409 \end{bmatrix}$$

$$X = \begin{bmatrix} 1, 12345, 11.2, 10 \\ 2, 21234, 19.57, 50 \\ 3, 3876, 28.5, 25 \\ 1, 12345, 18.2, 125 \\ 3, 38765, 278.5, 21 \\ 2, 21234, 190.57, 150 \end{bmatrix} \xrightarrow{\text{SVD}}$$

FIG. 5

STORING DATA AT EDGES OR CLOUD STORAGE WITH HIGH SECURITY

TECHNICAL FIELD

The subject application relates to data storage in general, and more particularly to more securely placing data at edges and in public/hybrid clouds.

BACKGROUND

Enterprises are rapidly moving toward implementing new radio (e.g., fifth generation and beyond). Storing data at edge computing facilities and in public/hybrid clouds, e.g., maintained in databases, facilitates effective and efficient access to the data, which allows for developing high-performance applications.

Such data contain a variety of information, including highly sensitive information (e.g., a wireless communications provider stores customer phone numbers, subscriber identity information, financial account numbers, customer locations and so on), which needs to be stored with very high security in different physical/virtual data stores. However, placing data at edge computing nodes and/or public/hybrid clouds increases the vulnerability of highly sensitive data being leaked.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 is a representation of a matrix that represents a database table for partitioning the matrix/table via singular value decomposition into multiple partitions, in accordance with various aspects and embodiments of the subject disclosure.

DETAILED DESCRIPTION

Figure 1:
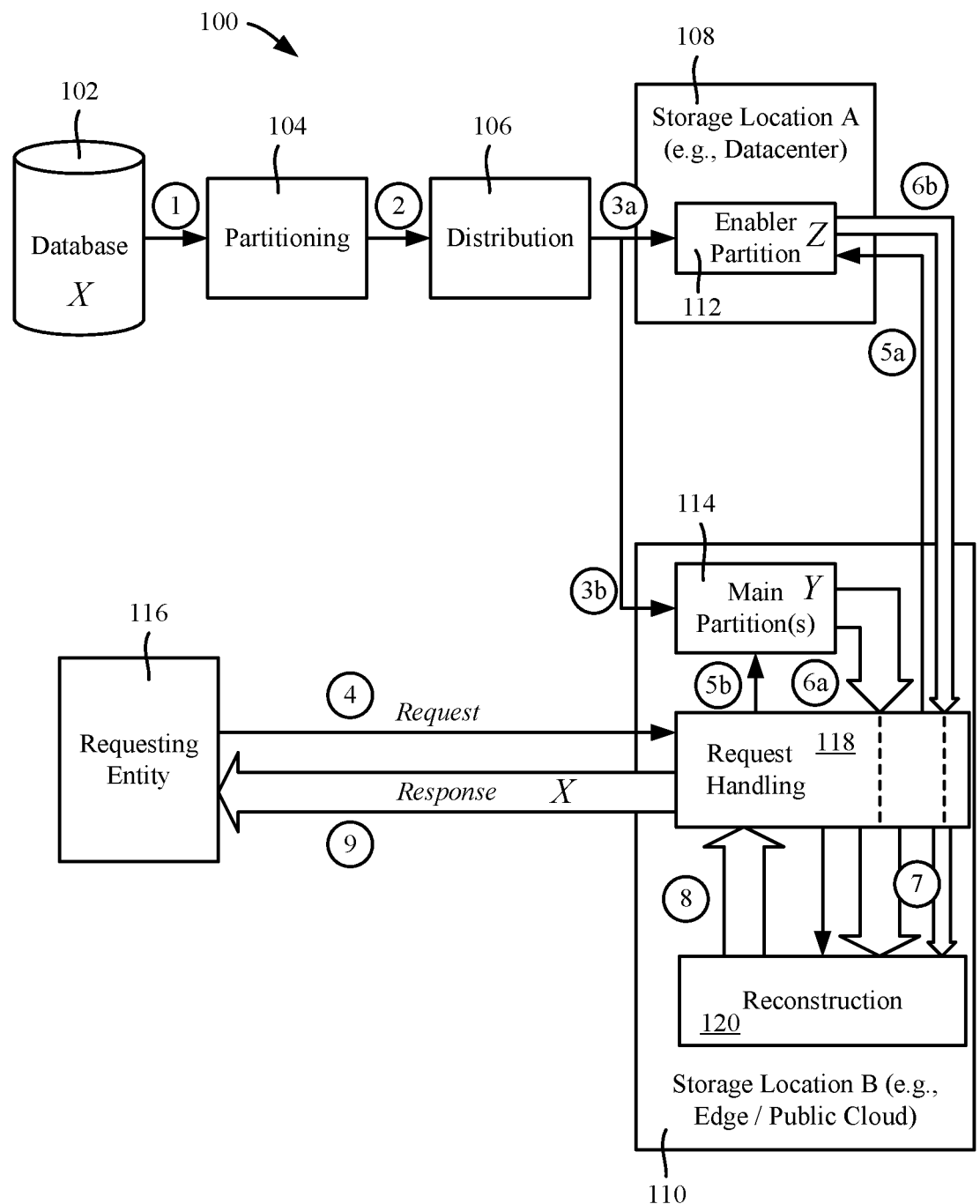
FIG. 1 is a block diagram illustrating an example system configured to partition data among different storage locations, in accordance with various aspects and embodiments of the subject disclosure.

The technology described herein is generally directed towards partitioning data for distributing parts of the data among storage location, which facilitates more securely placing data at edges and in public/hybrid clouds. The partitioning of the data allows for placement of the data closer to the customers at edges in a secure manner, whereby the latency of applications that need the data is reduced. For example, a large portion of the source partitioned data can be placed at edges and/or in public/hybrid clouds and stored in physical/virtual storages, with a smaller amount of enabler data (sensitive data or data needed to reconstruct the source data) maintained at a more secure location, such as an enterprise's on-premises datacenter. The need to attack two or more locations to access any meaningful data makes it more difficult for the data to be hacked.

For example, one way to partition source data is such that recovering the source data (e.g., to its original state) is possible by only having a full set of partitions; access to any subset of the partitions is not enough to recover the source data. As a result, this reduces the chance that hackers can obtain access to all partitions at a same time, whereby the chances of unauthorized access for possible data leaks/data breaches are significantly reduced. At the same time, to reduce latency, the larger partition(s) can be placed closer to the edge, with only the relatively very small enabler portion maintained at a different location and transmitted as needed for data reconstruction. Similarly, larger partition(s) can be placed on public/hybrid clouds, to reduce storage and maintenance costs while not being accessible from a single location without the other partition(s).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

FIG. 1 shows a high-level example of a system 100 in which a database 102 contains some data X that is to be securely maintained; for example, at least part of the data is defined as sensitive. Note that the database 102 of content X represents content/data in any format, including conventional database structures as well as other stores/data structures that traditionally may not be considered databases.

In the example system 100, the data X is partitioned (block 104) into multiple parts, as shown by the arrows labeled one (1) and (2). The partitions are then distributed (block 106, arrows labeled (3a) and (3b)) to different storage locations 108 and 110. As described herein, partitioning is performed on the data (in addition to applying any data-encoding, encryption, compression and/or the like) in a way that recovering the original data in a meaningful way is possible only by having the full set of partitions; access to a subset of the partitions are not enough to recover sensitive data. As described herein, partitioning reduces the chance that hackers can obtain access to the full set of partitions at a same time, whereby the possibility of data leaks/breaches is significantly reduced.

In one implementation, the data X is separated such that a sensitive partition or an enabler partition 112 containing data Z is maintained at a highly-secured location, such as an on-premises datacenter of an enterprise that owns the data, or a private cloud storage. One or more main partitions that contain the massive part/bulk of the data Y are maintained at an edge storage location and/or in a public/hybrid cloud storage location. For example, by placing the bulk of the data closer to entities (e.g., a requesting entity 116 such as a customer) that need the data at an edge storage location in a secure manner, the latency of applications is reduced, which is advantageous for many applications, including fourth generation-long term evolution (4G-LTE) as well as fifth generation (5G) applications and beyond.

In general, a requesting entity 116 makes a request (arrow (4)) to a request handling component 118 or the like at the edge or cloud storage location 110. Authentication and the like are not described herein; however it is understood that such conventional protections exist and that in this example, the requesting entity is authorized to obtain the requested data.

The request handling component 118 obtains the data partitions 112 and 114 (arrows (5a), (5b), (6a) and 6b)) and provides the parts Z and Y to a reconstruction component 120 (arrow (7)) that merges the parts to recreate the requested source data X in its original state, and returns the source data X to the request handling component 118 (arrow 8) to respond to the requesting entity's request (arrow 9). Note that while FIG. 1 shows the source data X being returned, which can be all of X, it is understood that the request may have been for only part of X, whereby only the relevant part needs to be reconstructed and/or returned.

Described herein are different strategies to distribute the partitioned data, which can be between datacenters, edge locations, public hybrid clouds and/or and local user machines/user devices. Using the general framework, internal and external users/partners/agencies can securely develop different high-performance applications. Note that using public/hybrid cloud strategies can reduce the cost of storing and maintaining the data, which can be of relatively massive volume (e.g., daily call records), which beneficial for the enterprise that needs to maintain the data.

The partitioning described herein is an enhancement or can be in contrast to traditional approaches that securely place data/databases at edges or public/hybrid clouds, using strong authentication procedures and advanced encoding-decoding techniques with high computational complexity. Indeed, the large number of recent data leaks/breaches indicates that such approaches are vulnerable to attacks, and cannot truly guarantee the security and integrity of data. In particular, approaches that rest data in a single place for a long-time tend to be more vulnerable, as hackers have enough time to try different methods to break the security obstacles.

Figure 2:
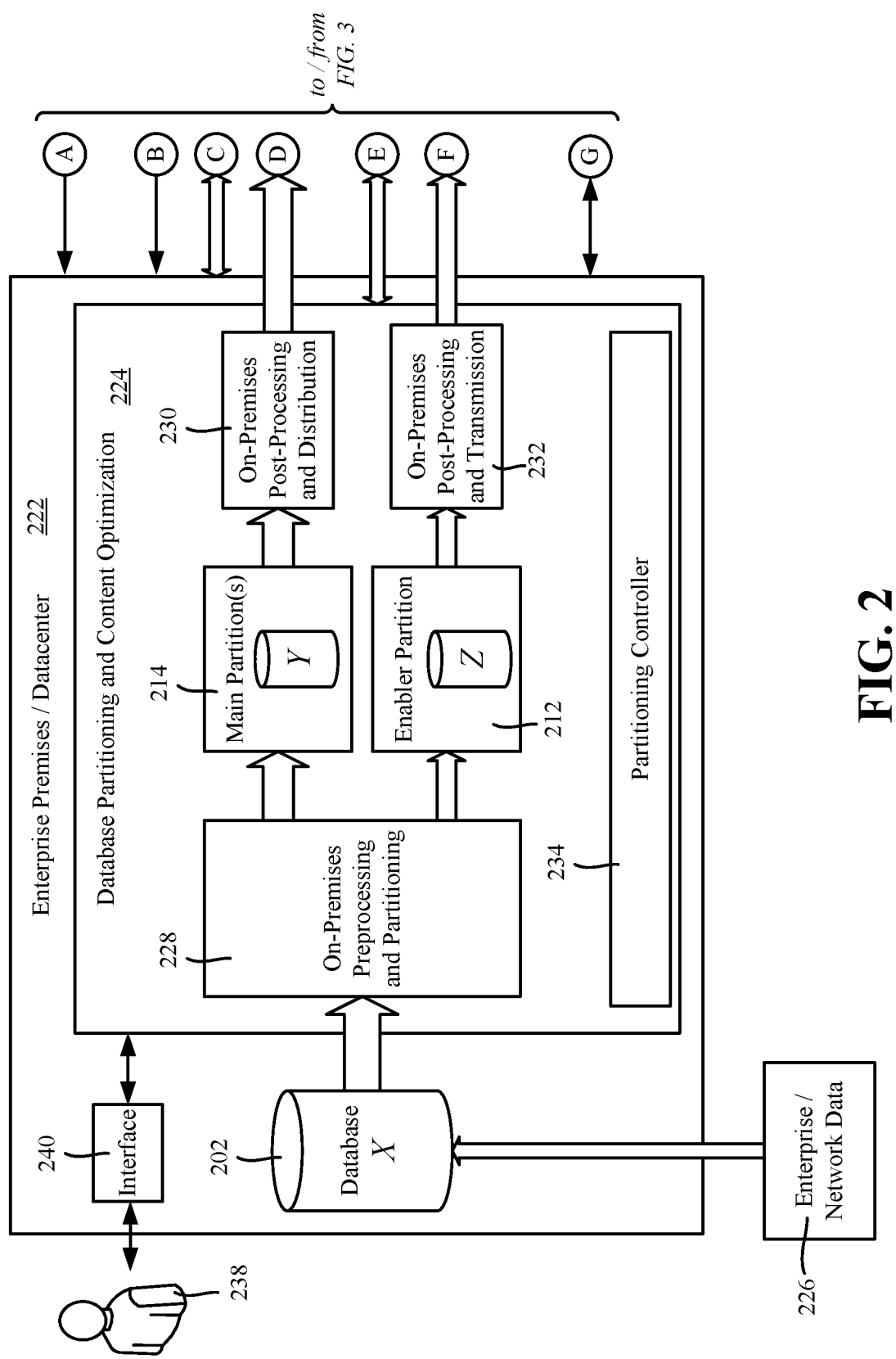
FIGS. 2 and 3 comprise a representation of an architecture/framework for partitioning data (FIG. 2) and reconstructing data from the partitions (FIG. 3), in accordance with various aspects and embodiments of the subject disclosure.
Figure 3:
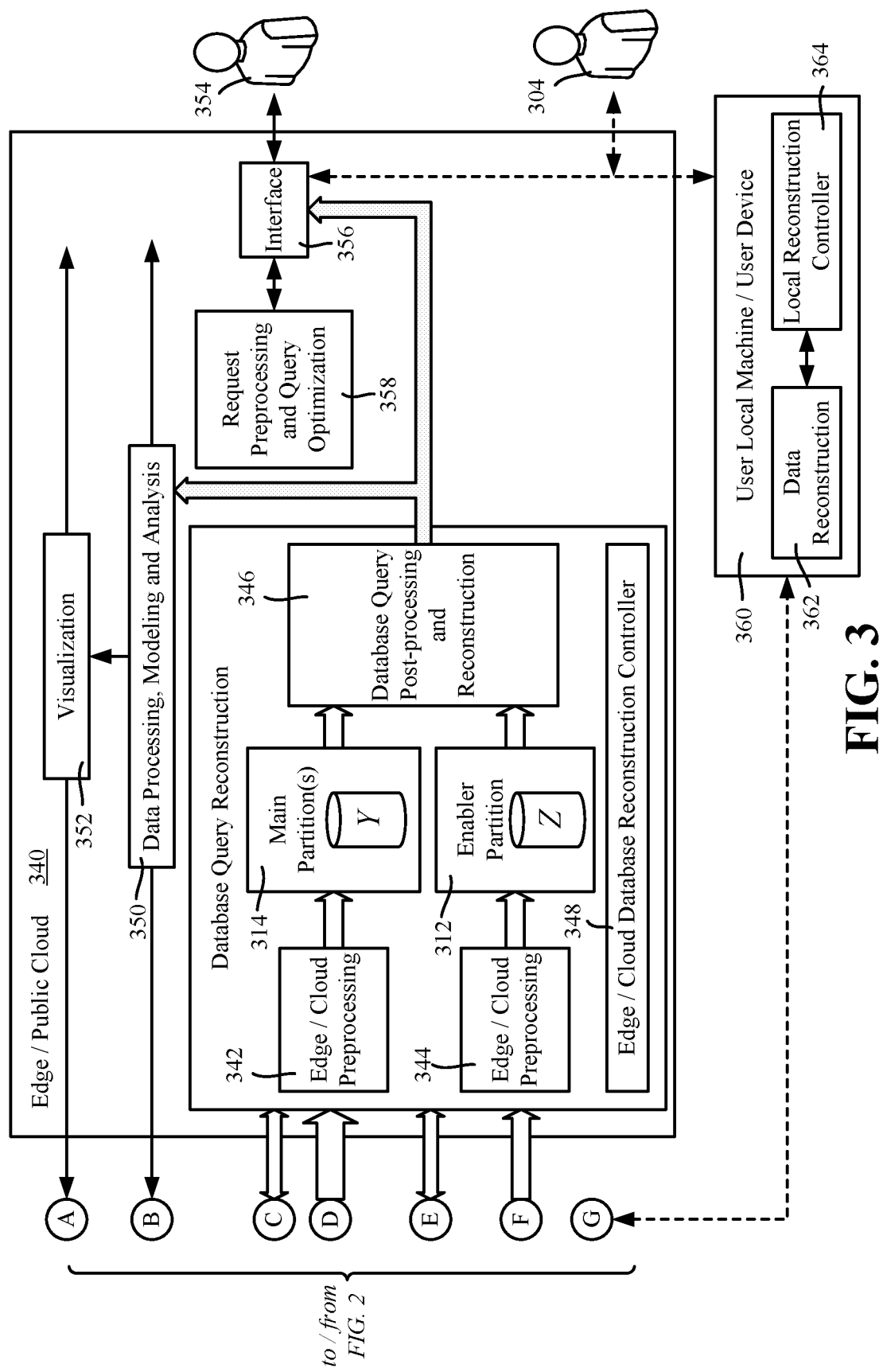

FIGS. 2 and 3 show a general block diagram of one example architectural framework, in which data is partitioned between computing facilities. In FIG. 2, an enterprise premises/datacenter 222 or the like includes a database partitioning and content optimization subsystem 224. It should be noted that terms used herein, such as "optimize," "optimization," "optimal" and the like only represent objectives to move towards a more optimal state, rather than necessarily obtaining ideal results.

In this framework, a database (e.g., 202) of data X collected for an enterprise network 226 is more optimally partitioned by on-premises preprocessing and partitioning (block 228) into multiple partitions (e.g. two partitions 212 and 214 as shown in FIGS. 2 and 3). Preprocessing can include, but is not limited to, encoding the data, reformatting the data (e.g., alphanumeric text strings to numbers or arrays/vectors), compressing the data, encrypting the data and so on, some or all of which can be before partitioning, after partitioning, or both before and after partitioning, e.g., depending on the type of preprocessing.

Once data preprocessing (if any) and partitioning is performed, the main partition(s) 214 (dataset Y) are post-processed as appropriate and distributed (block 230) to a storage location, which in this example is an edge/public/hybrid cloud 336 of FIG. 3. The enabler partition 212 (dataset Z) is post-processed as appropriate and (in this example) remains on the enterprise premises/datacenter 222 until some or all of it is needed and a copy transmitted (block 232) for reconstruction of some or all of the source data X.

In this example, a partitioning controller 234 controls the overall partitioning process. Note that an administrator 238 or the like via a suitable interface 240 can set various parameters, control preprocessing options, select different types of partitioning, and so on.

In general, data are usually stored in relational databases as a collection of tables constructed of rows and columns. Columns are sometimes called attributes and each table/relation represents one "entity type" (such as customer or product). The rows represent instances of that type of entity and the columns represent values attributed to that instance (such as address or price).

FIG. 3 shows the reconstruction of the data at an edge/public/hybrid cloud computing facility/node 340. In general, a main partition(s) copy 314 of the massive part(s) of the database 202 (FIG. 2) is transmitted to the computing facility/node 340, and can be preprocessed as appropriate (block 342). Some or all of an instance of the enabler partition 312 can be preprocessed as appropriate (block 344) and made be available for post-processing and reconstruction (block 346) at the edge/public/hybrid cloud computing facility/node 340, which can be in various (non-limiting) ways as described herein. In general, the data of the main partition(s) 314 can remain at the computing facility/node 340 for a long(er) time relative to the enabler part 312. Having all partitions, the original data can be reconstructed by applying appropriate pre/post processing (e.g. decoding, data reformatting/de-conversion, decompression, decryption, and adding the index/name of rows and columns to the table) at the edge/public/hybrid cloud computing facility/node 340. An edge/cloud database reconstruction controller 348 can control the overall data reconstruction process.

Note that as shown in FIG. 3, at the edge/public/hybrid cloud computing facility/node 340, the reconstructed data can be appropriately processed by data processing, modeling and analysis module 350 and the results can be visualized appropriately (block 352). An authorized entity 354 via a suitable interface 356 can make queries against the reconstructed data, including after any request preprocessing and query optimization (block 358). Note that as described herein, the request can be against the reconstructed data, and/or alternatively, some or all of the requested data can be reconstructed as needed (on demand) in response to the request.

FIG. 3 also represents another alternative, namely the use of a user local machine/user device 360 to perform data reconstruction (block 362) as controlled by a local reconstruction controller 364. Data reconstruction agent can be instantiated in the user local machine (internal or external user). Accordingly, data partitions are sent to the local machine where the data can be reconstructed. For example, the local reconstruction controller 364 can be an agent controller that synchronizes the data transfer, along with a partitioning controller and cloud database reconstruction controller (e.g., block 362), which guarantees the partitions are available on-time. The partitions can be deleted after a previously agreed expiration time, for example.

To summarize the example components/modules, the database partitioning controller 234 controls the data partitioning, as well as any data preprocessing. The cloud database reconstruction controller 348 and/or local database reconstruction controller 364 control the data reconstruction, as well as any data post-processing. The components/modules can also distribute and synchronize partitions at different locations and verify that the needed parts are available on-time for data reconstruction. For example, in one embodiment the database partitioning controller 234 uses sequence tracking identities to guarantee the presence of the needed partitions for data reconstruction at the edge/public/hybrid cloud computing facility/node 340 or local user machine/user device 360. To increase the security of data transfer, partitions can be transferred over different routes/ channels/network paths and/or at different times (e.g., partition Yin advance and partition Z on demand).

Moreover, in general users can send requests to query the data, after authentication and authorization. Based on the needed queries, a request preprocessing and query optimization component/module 358 can preprocess the requests and reorder them so that data is reconstructed with low computational overhead and on time, based on the application.

One straightforward implementation of the technology is to separate information defined as sensitive from information defined as relatively less sensitive. For example, consider an enterprise that deals with wireless communications, in which many tables contain very sensitive information such as International Mobile Subscriber IDs (IMSI), International Mobile Equipment IDs (IMEI), telephone numbers and so on. These information parts can be stored in different columns of various tables. In this straightforward implementation, the database massive partition Y can be a table that includes most columns of the table (e.g., key performance indicator values), excluding those columns defined as containing very sensitive information. Partition Y may be maintained on the edge/public/hybrid cloud locations, and even if improperly accessed, will be mostly just a large set of numbers unrelated to any particular users or devices, with little, if any, meaningful value to a hacker. The database enabler partition Z, comprising a table containing the columns defined as having very sensitive information, can be maintained on-premises. The original database X can be reconstructed, when needed, by merging these two tables into meaningful data. To facilitate the merge, tables Y and Z can have common columns (such as row/index number data). In this way, the massive part Y can stay on the edge or a cloud for a long or at least relatively longer time, because even though doing so makes this part more vulnerable to an attack, little value is obtained via the attack/the unauthorized access. For security reasons, the enabler part Z does not rest on public clouds for a long time, making it less susceptible to an attack, as part Z is transferred only when needed, and can be transferred in smaller parts as needed, e.g., only the rows/columns of sensitive data needed for a particular task), rather than as a whole. Although some data is maintained on the edge for a while, and thus can be more vulnerable to hacking, doing so does not reveal any sensitive information. At the same time, the latency of transferring possible massive amounts of data is reduced by its edge location, for example, with only a small amount of data needed from a more distant datacenter.

In another implementation, partitioning is performed on the source data X (in addition to performing any preprocessing such as data encoding and the like), in a way that recovering the original data is possible by only having access to the full set of partitions, with access to any smaller subset of partition(s) being insufficient to recover data. Accordingly, the vulnerability of leaking data is reduced as neither the small part(s) or large part(s) are enough to reconstruct the data.

For example, a table can be represented as a multidimensional matrix, and a collection of tables can be represented as multiple concatenated matrices/multidimensional arrays. Non-relational databases can also be modeled as a concatenation of multiple matrices, e.g., data stored in graph databases (or similar structures) can be modeled as multiple concatenated matrices, where node and relational attributes are stored in a sparse matrix or matrices, similar to and based on a graph adjacency matrix. Non-relational databases can also be partitioned in different ways based on how data are structured/stored in non-relational databases. For example, in graph databases, graph partitioning algorithms can be used to partition the graph database into multiple partitions, where each partition can be stored separately.

Based on the application and protection required (which can be defined in service level agreements (SLAs), for example), preprocessing (e.g. encoding, data format conversion, compression, encryption, and so on) can be applied before and after partitioning. Appropriate post-processing (e.g. decoding, data format reconversion, decompression, decryption, and so on) can be performed. Moreover, to improve the data protection security, more optimal physical/virtual location(s) for storing data partitions can also be determined.

Figure 4:
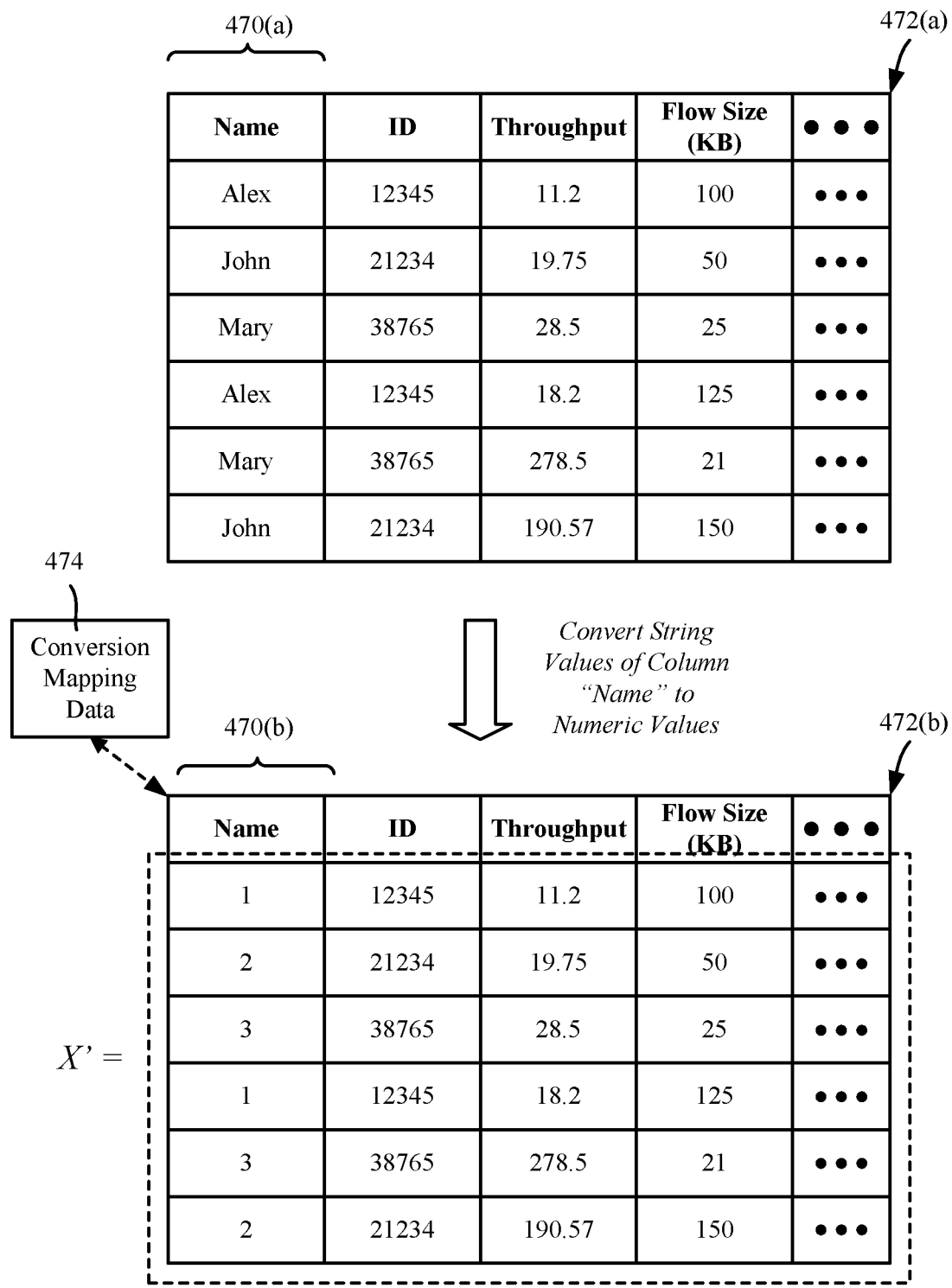
FIG. 4 is a representation of converting data from one format to another format prior to partitioning the data, in accordance with various aspects and embodiments of the subject disclosure.

Among these options, as shown in FIG. 4, data-format conversion can be used to convert string values (or other non-numeric data types) to numbers or arrays of numbers; e.g., "Alex" can be mapped to 1, or an array/vector such as 0, 1. Data format reconversion converts the numbers back to the original data format. Thus for example, the "name" column 470(a) in a data structure 472(a) can be converted from string formatted data to a numeric formatted data (column 470(b) in a data structure 472(b)), such as to have a dataset X' (converted from X) with only numeric values/arrays therein, suitable for a matrix. The conversion mapping data 474 is maintained at any suitable storage location (e.g., the edge/cloud location), so that once reconstructed, reconversion of the values back to names in string format restores the source data to its original state.

With a matrix, the partitioning can be done by applying one of any suitable operations/transformations on the original database data. For example, applying singular value decomposition (SVD), wavelet transform, machine learning-based or artificial intelligence-based transformations can be used to partition data.

FIG. 5 shows how singular value decomposition (SVD) can be used to partition source data. Consider a database (including any data structure of content) that is represented by a matrix $X_{n \times m}$ of size n×m. Without loss of generality, assume that n>m and rank(X)=r=m. To partition X, one implementation takes the SVD of X, where X can be written as:

$$X_{n \times m} =$$

$$U_{n \times n} S V^T_{m \times m} = \begin{bmatrix} u_{11}, u_{12}, \ldots, u_{1n} \\ u_{21}, u_{22}, \ldots, u_{2n} \\ u_{n1}, u_{n2}, \ldots, u_{nn} \end{bmatrix} \begin{bmatrix} s_1, 0, \ldots, 0 \\ 0, s_2, 0, \ldots \\ \ldots \\ 0, \ldots, 0, s_m \\ 0, \ldots, 0 \\ 0, \ldots, 0 \end{bmatrix} \begin{bmatrix} v_{11}, v_{12}, \ldots, v_{1m} \\ v_{21}, v_{22}, \ldots, v_{2m} \\ v_{m1}, v_{m2}, \ldots, v_{mm} \end{bmatrix}^T$$

$$= [U_1 \ \ldots \ U_n] \begin{bmatrix} s_1 V_1^T \\ s_m V_m^T \end{bmatrix} = \sum_{k=1}^{r} s_k U_k V_k^T$$

Each entry $x_{ij}$ of X can be reconstructed using:

$$x_{ij} = \sum_{k=1}^{r} s_k u_{ik} v_{kj}^T$$

FIG. 5 thus shows an example of how to take the SVD of a table in a database, with values of non-numeric columns (e.g. column "Name") having previously been converted (e.g., as in FIG. 4) to a numeric values by using an appropriate one-to-one mapping function. As can be seen, the correct reconstruction of the original table (X) requires access to U, V and S; without having the full set of these three parts, the correct reconstruction is impossible. Also, access to each part or subset of parts is virtually meaningless.

Further, consider the following to exemplary partitions of X where:

a) DB Massive Part $Y=\{U,V\}$ and DB Enabler part $Z=S$ and
$X=\Sigma_{k=1}^{r} s_k U_k V_k^T$ b)

$X=\Sigma_{k \in I_1} s_k U_k V_k^T + \Sigma_{k \in I_2} s_k U_k V_k^T$ where DB Massive Part Y is $\Sigma_{k \in I_1} s_k U_k V_k^T$, DB Enabler part Z is $\Sigma_{k \in I_2} s_k U_k V_k^T$ and $I_1$ and $I_2$ are subsets of $I=\{1, 2, \ldots, r\}$ where $I_1 \cup I_2 = \{1, 2, \ldots r\} = I$ and $I_1 \cap I_2 = \emptyset$.

Returning to FIG. 3, based on the queries, the request pre-processing and query optimization module 358 selects which $U_i$, $V_j^T$ and $s_l$ are needed. The request pre-processing and query optimization module 358 preprocesses the requests and reorders them so that data is reconstructed with minimal computations and on-time, based on the application.

Note that in one alternative to that of FIGS. 2 and 3, without loss of generality and to reduce transferring cost, the partitioning can be performed done at the edge/public/hybrid cloud computing facility/node 340. In this way, after taking the SVD of X, for example, the massive parts Y (where $Y=\{U,V\}$) and the enabler part(s) Z (where $Z=S$) are computed. Then, Z is transferred to the on-premises datacenter or other highly-secure facility and it is removed from the more vulnerable edge/public/hybrid cloud computing facility/node 340.

As is understood, as used herein, the technology applies to protecting content at edge computing facilities as well as protecting content at public/hybrid clouds. This facilitates securely distributing data worldwide. In this way, an enterprise can partition contents and store the massive parts at the edge computing facilities/public/hybrid cloud computing facilities in advance. When a customer requests some content, that content can be activated using the enabler part and transmitted to the customer with very low-latency. Note that, most data/content are or can be transformed to a matrix form (e.g. images are 2D matrices and videos are multi-dimensional 2D matrices) and mathematical transformation can be easily applied to matrices.

Figure 6:
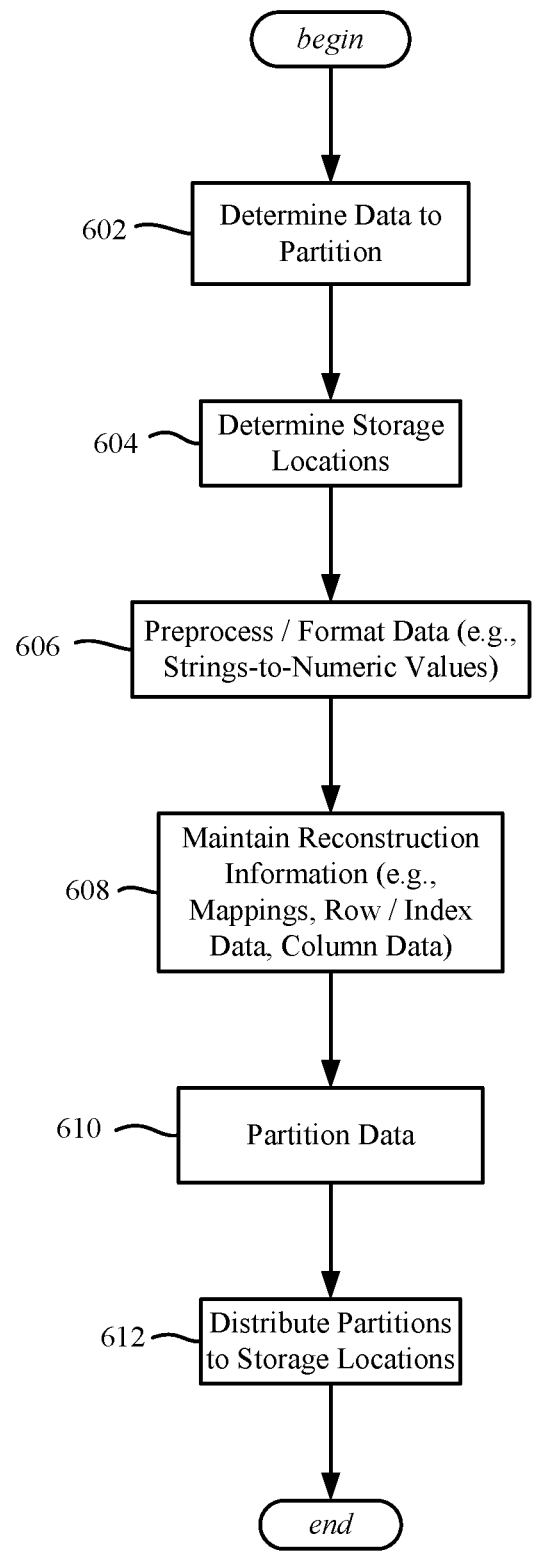
FIG. 6 is a flow diagram representing example operations related to partitioning data, in accordance with various aspects and embodiments of the subject disclosure.

FIG. 6 is a flow diagram of example operations related to partitioning a database, beginning at operation 602 where the data to partition is determined. Operation 604 represents determining the storage locations for the data partitions.

Operation 606 represents preprocessing the data as appropriate, which, for example, can include converting strings to numeric values as described herein with reference to FIG. 4. Operation 608 represents maintaining any variable information needed for reconstruction of the source data, (e.g., mappings, row/index data, column data, encryption/compression/encoding parameters).

Operation 610 represents partitioning the data, which, for example, can be by separating sensitive data from less-sensitive data, by applying singular value decomposition or another transform that can be reversed, or the like.

Operation 610 represents distributing the partitions to their storage locations, which as described herein are not generally to a same location that can be accessed at a same time. Note that as described herein as one example alternative, one partition or group of partitions can be sent from a datacenter to an edge or cloud location, with another part maintained at the datacenter. It is also possible that the partitioning can be done at the edge or cloud location, with one part (e.g., the small enabler partition) sent back to the datacenter and then removed from the edge or cloud location, as described herein as another example alternative.

Figure 7:
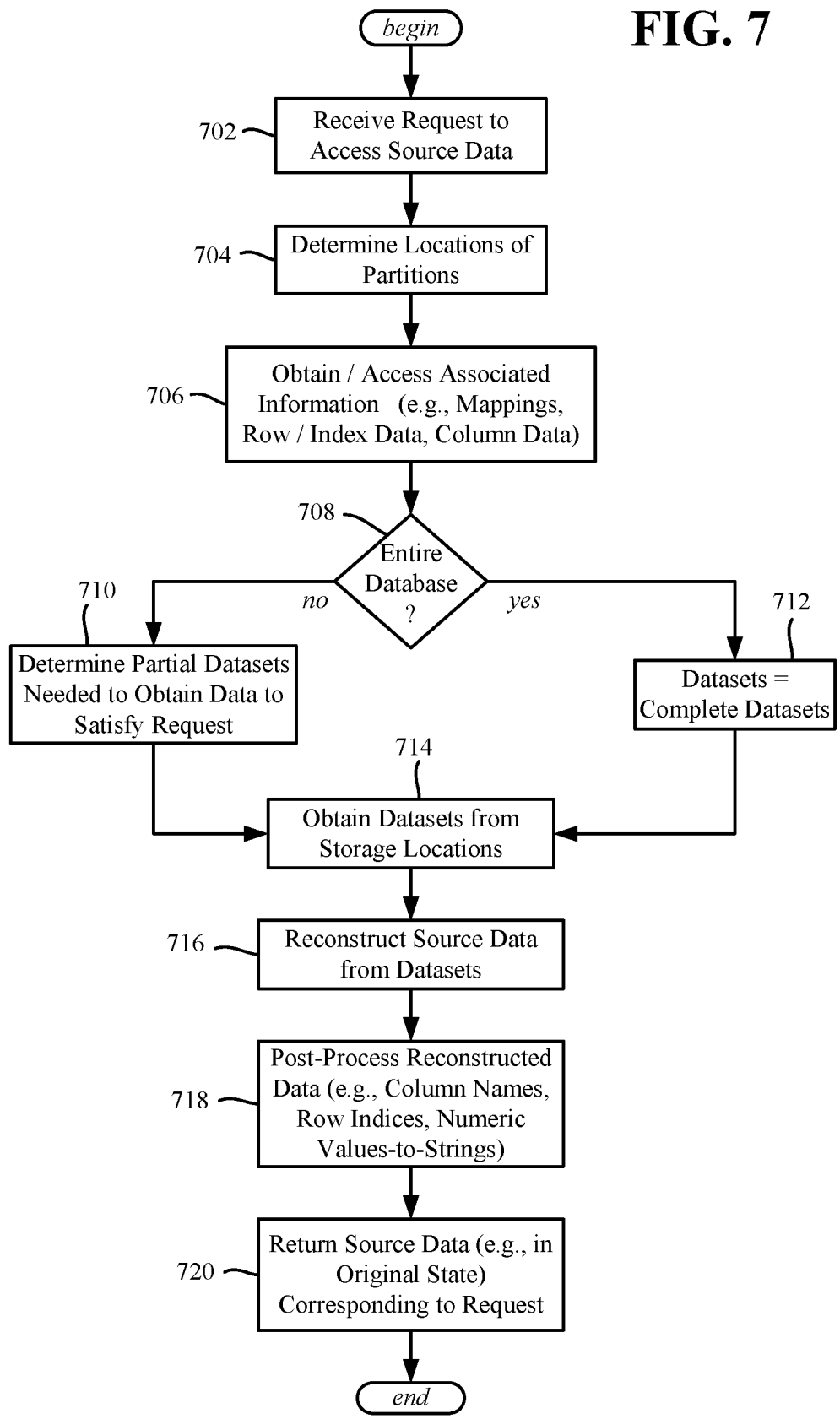
FIG. 7 is a flow diagram representing example operations related to reconstructing partitioned data, in accordance with various aspects and embodiments of the subject disclosure.

FIG. 7 is a flow diagram of example operations related to reconstructing the source data to its original state from parts of a partitioned database beginning at operation 702 where some request (e.g., user-initiated, application-initiated, a periodic update and so on) triggers the data reconstruction process. Operation 704 determines the locations of the partitions if not already predetermined, e.g., which edge location is closest to a requesting user. Operation 704 represents obtaining/accessing associated pre- or post-processing information (e.g., mappings, row/index data, column data, variable parameter data) needed to reconstruct the data.

It is possible that the entire database is to be reconstructed, as evaluated via operation 708. If only part is needed, operation 710 determines the partial datasets (e.g., the parts of Y and/or Z) needed to obtain data to satisfy the request; otherwise the datasets are the full datasets (operation 712).

Operation 714 obtains/accesses the datasets from their respective storage locations, and operation 716 reconstructs the source data from datasets. Note that some preprocessing (e.g., decompression, decoding, decryption) may need to be done on the data before merging the partitions to obtain the source data.

Operation 718 represents post-processing the reconstructed data as needed, (e.g., to insert column names, sort row indices, reformat numeric values/arrays to strings and so on). Operation 720 returns the corresponding source data, e.g., in its original state, in response to the request.

The following are some non-limiting example usage scenarios that describe aspects of the technology described herein. For example consider that the database "massive" part(s) Y is transmitted to the edge/public/hybrid cloud computing facility/node 340 and rests there for a long or relatively longer time. Based on the application and when the data is needed, the enabler part or parts Z is transmitted to the computing facility/node 340 and X (or the queried part thereof) is reconstructed. Users can access the database (or an authorized part thereof) as usual and query the data of interest. The enabler part(s) Z can be removed from the computing facility/node 340 as needed to maintain a desired level of security.

In another example scenario, consider that the massive" part(s) Y is transmitted to the edge/public/hybrid cloud computing facility/node 340, again being maintained there for a long(er) time. Based on the application and when user request(s) are received, part of Z that is needed for reconstructing user data is transmitted to the computing facility/node 340, and the part of X that contains the data requested by the user is reconstructed and returned to the user.

In yet another example scenario, consider that parts Y and Z are transmitted to the edge/public/hybrid cloud computing facility/node 340, and stored securely, possibly in different edges/racks/servers. When data is needed, e.g., by an application or based on user queries, X or part of X is reconstructed.

In still another example scenario, consider a data reconstruction agent being instantiated at a user local machine or user device (e.g., block 360 of FIG. 3). The needed parts Y and Z are both transmitted to the local machine/device and stored securely. When the data is needed, or based on user queries, X or part of X is reconstructed. A feasible option is to transmit Y (or part thereof) first and then, gradually and based on the need, send Z (or part thereof) to the local machine.

Different machine learning/artificial intelligence models, e.g., with deep reinforcement, can also be built/utilized using the source data reconstructed data. For example, it can be learned that one type of application can be more efficient (including for data reconstruction) with one type of data partitioning such as SVD, relative to another type (e.g., wavelet transform-based) that is more efficient with another type of data partitioning. Security levels can also learned over time, e.g., one type of data is more secure if partitioned in one way, while another type of data is more secure if partitioned in another way Accordingly, the technology can place the data/content more closer to the customer at edges in a secure manner and reduce the latency of applications. Note that, quantum computing technologies can also be used to speed up the reconstruction computation process.

Figure 8:
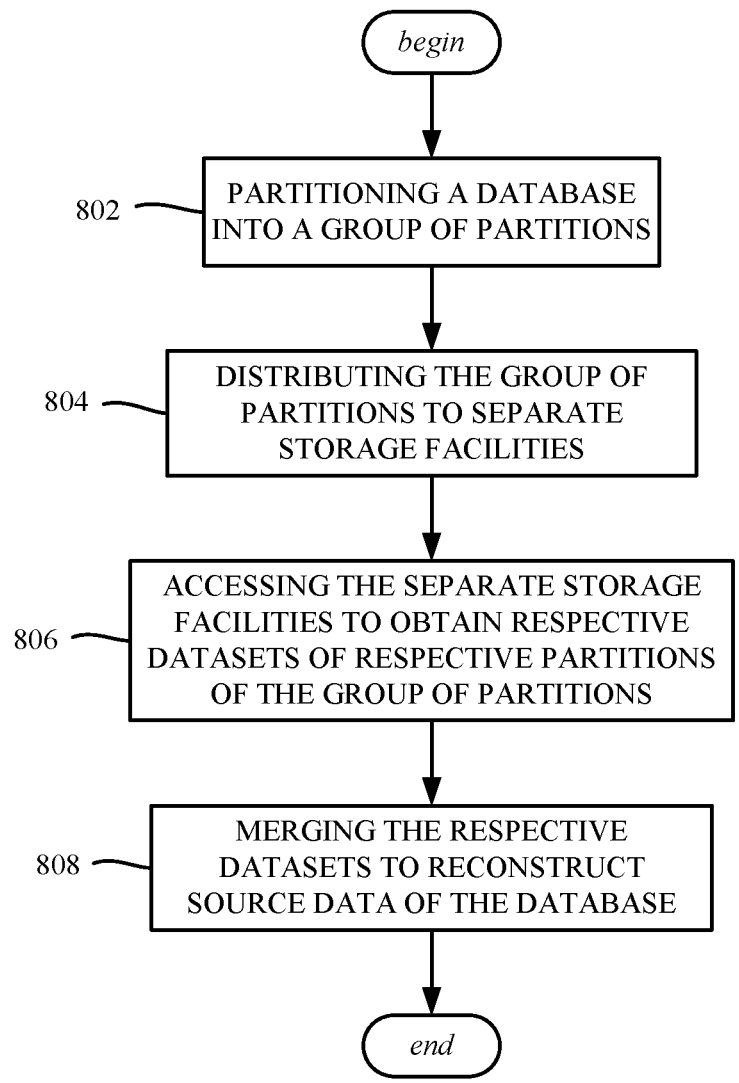
FIG. 8 is a flow diagram representing example operations related to partitioning data, distributing the partitions, and merging the partitions back into source data, in accordance with various aspects and embodiments of the subject disclosure.

One or more example aspects are represented in FIG. 8, and can correspond to a system, including a processor, and a memory that stores executable instructions that, when executed by the processor, facilitate performance of operations. Example operation 802 represents partitioning a database into a group of partitions. Operation 804 represents distributing the group of partitions to separate storage facilities. Operation 806 represents accessing the separate storage facilities to obtain respective datasets of respective partitions of the group of partitions. Operation 808 represents merging the respective datasets to reconstruct source data of the database.

Partitioning the database into the group of partitions can include separating columns and/or rows of the database into a first partition comprising first columns and/or rows of first information defined as sensitive information, and a second partition comprising second columns and/or rows of second information defined as less-sensitive information relative to the sensitive information.

Distributing the group of partitions to the separate storage facilities can include maintaining the first partition at at least one of: a private datacenter, a centralized computing facility, a public cloud storage facility, a private cloud storage facility, a hybrid cloud facility, or an edge computing facility, and maintaining second partition at at least one of: a private datacenter, a centralized computing facility, a public cloud storage facility, a private cloud storage facility, a hybrid cloud facility, or an edge computing facility. For example, a group of partitions can be maintained at a cloud facility on different physical/virtual storages.

Partitioning of the database into the group of partitions can include representing the database as a matrix, and transforming the matrix into the group of partitions. The database can include a column and/or row including non-numeric data, and further operations can include converting the column and/or row of non-numeric data to numeric values or numeric arrays for representing the database as a matrix. Partitioning the database into the group of partitions and/or transforming the matrix into the group of partitions can include applying a mathematical transformation for obtaining multiple partitions. Transforming of the matrix into the group of partitions can include applying singular value decomposition to the matrix to obtain three partitions. Distributing the group of partitions to the separate storage facilities can include maintaining a first partition and a second partition of the three partitions at an edge computing facility, and distributing of the group of partitions to the separate storage facilities can include maintaining a third partition of the three partitions at a centralized computing facility. Further operations can include transmitting a dataset including part of the third partition from the centralized computing facility to the edge computing facility, and merging the respective datasets to reconstruct the source data of the database can include merging part of the first partition, part of the second partition and the part of the third partition to reconstruct part of the database as the source data.

Further operations can include transmitting a dataset including the third partition from the centralized computing facility to the edge computing facility, and merging the respective datasets to reconstruct the source data of the database can include merging the first partition, the second partition and the third partition to completely reconstruct the database as the source data.

Further operations can include transmitting the respective datasets of the respective partitions of the group of partitions to a user local machine or user device, and wherein the merging of the respective datasets to reconstruct the source data of the database is performed on the user local machine or the user device.

Figure 9:
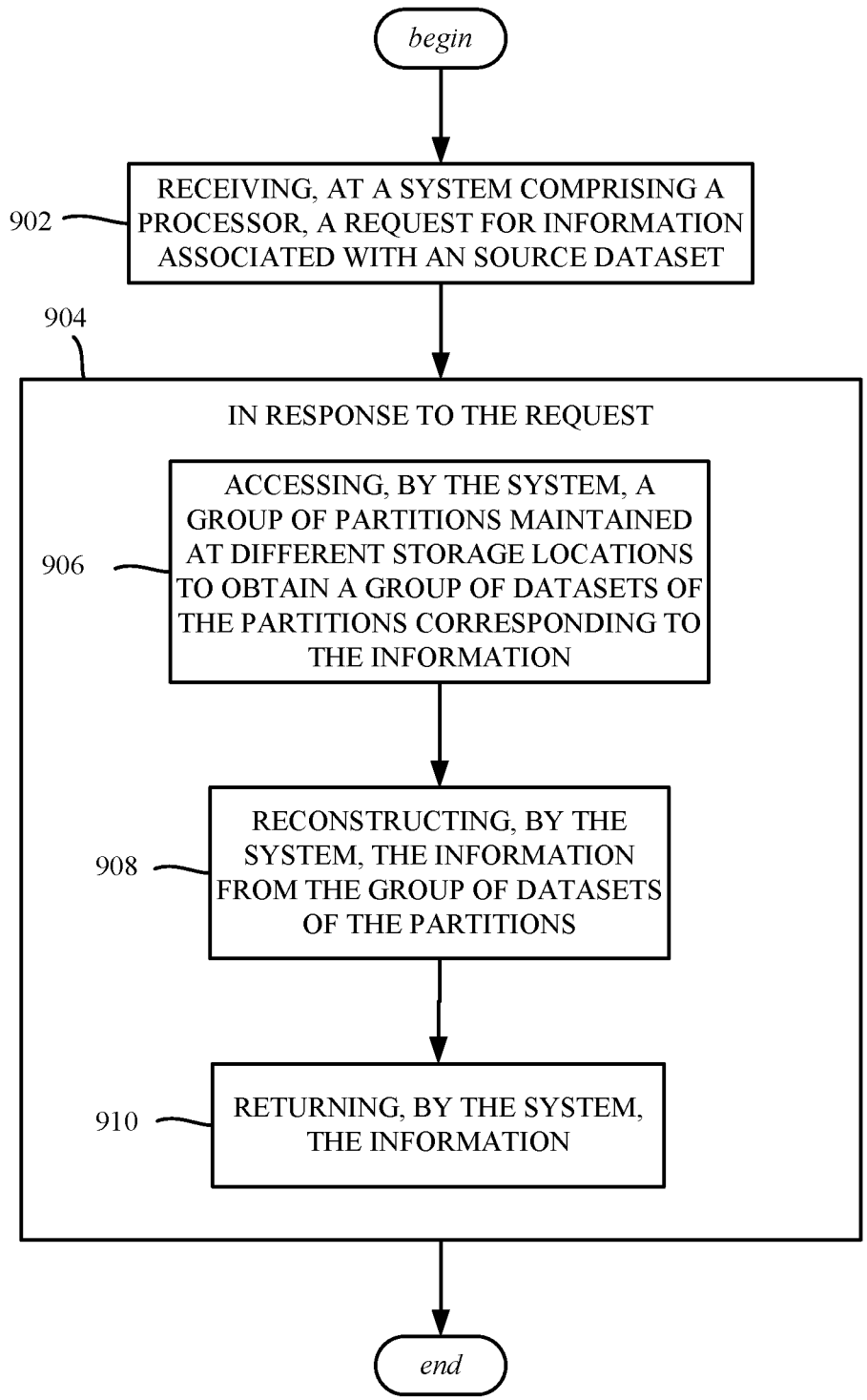
FIG. 9 is a flow diagram representing example operations related to reconstructing data from partitioned datasets, in accordance with various aspects and embodiments of the subject disclosure.

One or more example aspects are represented in FIGS. 9, and, for example, can correspond to operations, such as of a method. Example operation 902 represents receiving, at a system including a processor, a request for information associated with a source dataset. Example operation 904 represents, in response to the request, accessing, by the system, a group of partitions maintained at different storage locations to obtain a group of datasets of the partitions corresponding to the information (operation 906), reconstructing, by the system, the information from the group of datasets of the partitions (operation 908), and returning, by the system, the information (operation 910).

The system can include an edge computing node, and accessing the group of partitions maintained at the different storage locations to obtain the group of datasets of the partitions corresponding to the information can include obtaining a first dataset of a first partition of the group of partitions from a storage location of the edge computing node, and obtaining a second dataset of a second partition of the group of partitions from a non-edge storage location.

The system can include an edge computing node that maintains a first partition and a second partition of the group of partitions, and accessing the group of partitions maintained at the different storage locations to obtain the group of datasets of the partitions corresponding to the information can include obtaining a first dataset of the first partition from a first storage location at the edge computing node, obtaining a second dataset of the second partition from a second storage location of the edge computing node, and obtaining a third dataset of the third partition of the group of partitions from a non-edge storage location.

The system can include a user device, and accessing the group of partitions maintained at the different storage locations to obtain the group of datasets of the partitions corresponding to the information can include receiving a first dataset of a first partition of the group of partitions from a remote first storage location, and receiving a second dataset of a second partition of the group of partitions from a remote second storage location.

Figure 10:
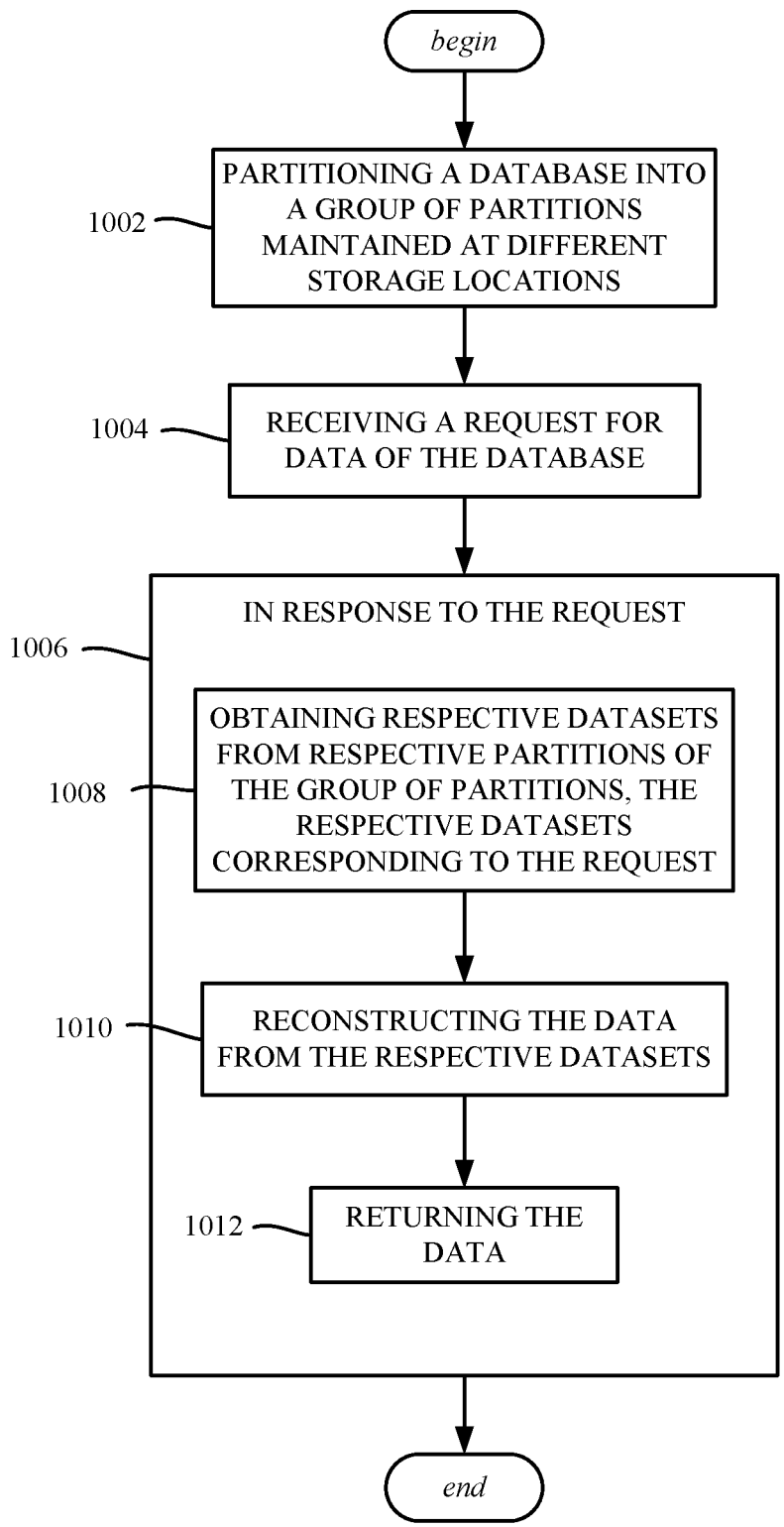
FIG. 10 is a flow diagram representing example operations related to partitioning data into a group of partitions and reconstructing the data from datasets of the partitions, in accordance with various aspects and embodiments of the subject disclosure.

One or more aspects are represented in FIG. 10, such as implemented in a machine-readable medium, including executable instructions that, when executed by a processor, facilitate performance of operations. Example operation 1002 represents partitioning a database into a group of partitions maintained at different storage locations. Operation 1004 represents receiving a request for data of the database. Operation 1006 represents, in response to the request, obtaining respective datasets from respective partitions of the group of partitions, the respective datasets corresponding to the request (operation 1008), reconstructing the data from the respective datasets (operation 1010), and returning the data (operation 1012).

Partitioning the database into the group of partitions can include representing the database as a matrix, and applying a transformation to the matrix that transforms the matrix into the group of partitions.

Representing the database as a matrix can include converting a column including data formatted as strings into a column including numeric values or numeric arrays that represent the strings.

Obtaining the respective datasets from respective partitions of the group of partitions can include accessing a first partition of the group of partitions from an edge computing node, and accessing a second partition of the group of partitions from a non-edge computing node.

Receiving the request for data of the database can include receiving a request for part of the database; obtaining of the respective datasets from the respective partitions of the group of partitions can include obtaining, as the respective datasets, parts of the respective partitions that correspond to the request.

As can be seen, the technology described herein facilitates placing data/databases/contents at edges and in public/hybrid clouds in a manner that provides for very high security. By placing data closer to the customers at edges in a secure manner, the latency of applications is reduced which is needed for many LTE/5G applications and the like. By partitioning data into multiple parts (in addition to applying any pre- or post-processing), the data is distributable such that recovering the original data is possible by only having the partitions, thereby significantly reducing the vulnerability of data to possible leaks/breaches. Different strategies can be used to distribute the partitioned data, e.g., between an enterprise's premises/datacenter, edges and in public/hybrid clouds, and/or local user machines. Note that using public/hybrid cloud strategies can reduce the cost of storing and maintaining voluminous amounts of data.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 11:
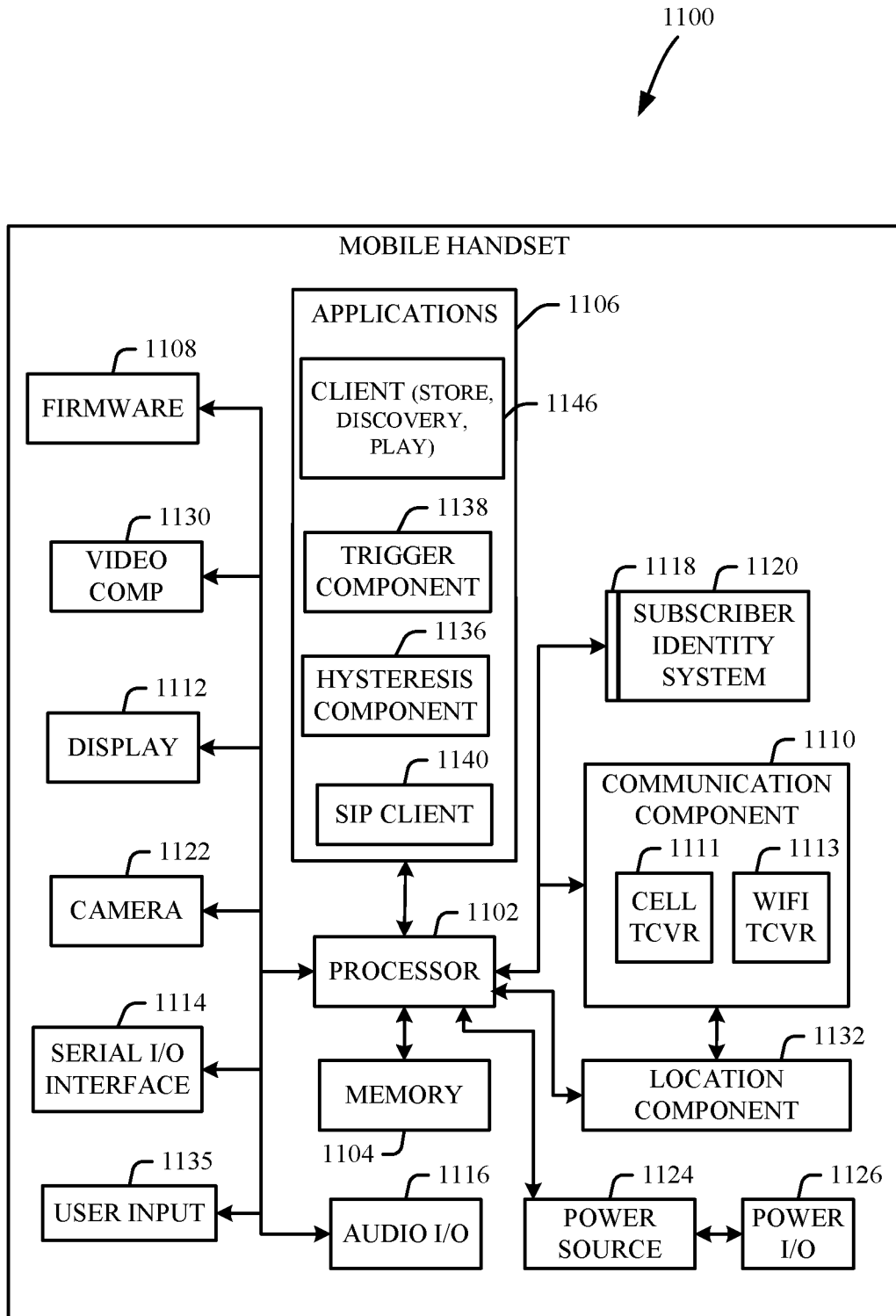
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device (such as user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
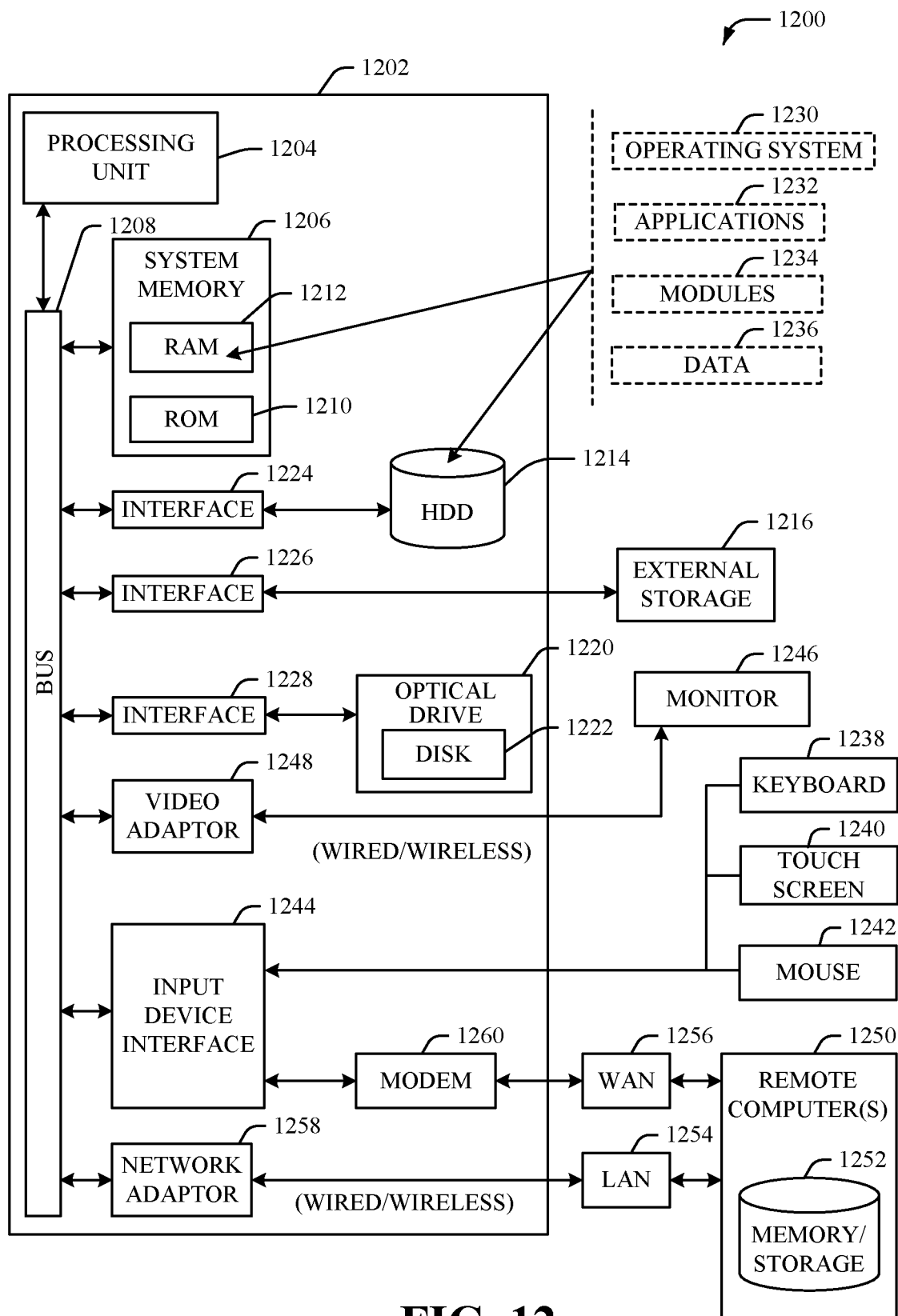
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
   transforming non-numeric data in a database to numeric values;
   maintaining a mapping of the numeric values to the non-numeric data;
   representing the database as a multidimensional matrix;
   partitioning the database into a group of partitions by performing singular value decomposition (SVD) on the multidimensional matrix, wherein the group of partitions includes a main partition and an enabler partition, and wherein the mapping is included in the enabler partition;

distributing the group of partitions to separate storage facilities;

accessing the separate storage facilities to obtain respective datasets of respective partitions of the group of partitions; and merging the respective datasets and reverse transforming the numeric values to the non-numeric data using the mapping to reconstruct source data of the database.

2. The system of claim 1, wherein the partitioning of the database into the group of partitions comprises decomposing the multidimensional matrix $X_{n \times m}$ into three datasets $U_{n \times n}$, $S$, $V_{m \times m}^T$ where $X_{n \times m} = U_{n \times n} S V_{m \times m}^T$, and S is included in the enabler partition.

3. The system of claim 1, wherein the distributing of the group of partitions to the separate storage facilities comprises maintaining the enabler partition at a private datacenter, and maintaining the main partition at an edge computing facility.

4. The system of claim 1, wherein the operations further comprise transmitting the respective datasets of the respective partitions of the group of partitions to a user local machine or user device, and wherein the merging of the respective datasets to reconstruct the source data of the database is performed on the user local machine or the user device.

5. The system of claim 1, wherein the multidimensional matrix is represented as $X_{n \times m} = U_{n \times n} S V_{m \times m}^T$, where S is included in the enabler partition.

6. The system of claim 5, wherein the transforming the non-numeric data in the database to the numeric values comprises transforming a name associated with an International Mobile Subscriber ID (IMSI) into a number.

7. The system of claim 5, wherein the merging the respective datasets comprises $$x_{ij} = \Sigma_{k=1}^r s_k u_{ik} v_{kj}^T$$

wherein $s_k$ is part of the enabler partition, and $u_{ik} v_{kj}^T$ is part of the main partition.

8. The system of claim 5, wherein the transforming of the matrix into the group of partitions comprises transforming the matrix to obtain three partitions.

9. The system of claim 8, wherein the distributing of the group of partitions to the separate storage facilities comprises maintaining the main partition and a third partition of the three partitions at an edge computing facility, and wherein the distributing of the group of partitions to the separate storage facilities comprises maintaining the enabler partition of the three partitions at a private cloud storage facility.

10. The system of claim 9, wherein the operations further comprise transmitting a dataset comprising part of the enabler partition from the private cloud storage facility to the edge computing facility, and wherein the merging of the respective datasets to reconstruct the source data of the database comprises merging part of the main partition, part of the enabler partition and the part of the third partition to reconstruct part of the database as the source data.

11. The system of claim 9, wherein the operations further comprise transmitting a dataset comprising the enabler partition from the private cloud storage facility to the edge computing facility, and wherein the merging of the respective datasets to reconstruct the source data of the database comprises merging the main partition, the enabler partition and the third partition to completely reconstruct the database as the source data.

12. A method, comprising:

representing, by a system comprising a processor, a database as a multidimensional matrix;

partitioning, by the system, the database into a group of partitions maintained at different storage locations by performing singular value decomposition (SVD) on the multidimensional matrix, wherein the group of partitions includes a main partition and an enabler partition;

receiving, by the system, a request for information associated with a source dataset, wherein the source dataset comprises a multidimensional matrix and the request for information comprises a request for an element $x_{ij}$ of the multidimensional matrix $X_{n \times m}$; and in response to the request, accessing, by the system, a group of partitions maintained at different storage locations to obtain a group of datasets of the partitions corresponding to the information, wherein the group of partitions includes a main partition and an enabler partition, the enabler partition including mapping to map numeric values in the main partition to non-numeric data;

transforming, by the system, the numeric values in the main partition to the non-numeric data using the mapping included in the enabler partition;

reconstructing, by the system, the information from the group of datasets of the partitions as $$x_{ij} = \Sigma_{k=1}^r s_k u_{ik} v_{kj}^T$$

wherein $s_k$ is part of the enabler partition, and $u_{ik} v_{kj}^T$ is part of the main partition; and returning, by the system, the information.

13. The method of claim 12, wherein the system comprises an edge computing node, and wherein the accessing of the group of partitions maintained at the different storage locations to obtain the group of datasets of the partitions corresponding to the information comprises obtaining a first dataset of the main partition of the group of partitions from a storage location of the edge computing node, and obtaining a second dataset of the enabler partition of the group of partitions from a non-edge storage location.

14. The method of claim 12, wherein the system comprises an edge computing node that maintains the main partition and a third partition of the group of partitions, and wherein the accessing of the group of partitions maintained at the different storage locations to obtain the group of datasets of the partitions corresponding to the information comprises obtaining a first dataset of the main partition from a first storage location at the edge computing node, obtaining a second dataset of the third partition from a second storage location of the edge computing node, and obtaining a third dataset of the enabler partition of the group of partitions from a non-edge storage location.

15. The method of claim 12, wherein the system comprises a user device, and wherein the accessing of the group of partitions maintained at the different storage locations to obtain the group of datasets of the partitions corresponding to the information comprises receiving a first dataset of the main partition of the group of partitions from a remote first storage location, and receiving a second dataset of the enabler partition of the group of partitions from a remote second storage location.

16. A non-transitory machine-readable medium, comprising executable instructions that, when executed by a processor, facilitate performance of operations, the operations comprising:
- representing a database as a multidimensional matrix;
- transforming non-numeric data in the multidimensional matrix to numeric values;
- maintaining a mapping of the numeric values to the non-numeric data;
- partitioning the database into a group of partitions maintained at different storage locations by performing singular value decomposition (SVD) on the multidimensional matrix, wherein the group of partitions includes a main partition and an enabler partition, and wherein the mapping is included in the enabler partition;
- receiving a request for data of the database; and
- in response to the request,
  - obtaining respective datasets from respective partitions of the group of partitions, the respective datasets corresponding to the request,
  - reverse transforming the numeric values in the main partition to the non-numeric data using the mapping included in the enabler partition,
  - reconstruction the data from the respective datasets; and
  - returning the data.

17. The non-transitory machine-readable medium of claim 16, wherein the obtaining of the respective datasets from respective partitions of the group of partitions comprises accessing the main partition of the group of partitions from an edge computing node, and accessing the enabler partition of the group of partitions from a non-edge computing node.

18. The non-transitory machine-readable medium of claim 16, wherein the receiving of the request for data of the database comprises receiving a request for part of the database, and wherein the obtaining of the respective datasets from the respective partitions of the group of partitions comprises obtaining, as the respective datasets, parts of the respective partitions that correspond to the request.

19. The non-transitory machine-readable medium of claim 16, wherein the multidimensional matrix is represented as $X_{n \times m} = U_{n \times n} S V_{m \times m}^T$, where S is included in the enabler partition.

20. The non-transitory machine-readable medium of claim 19, wherein the reverse transforming comprises:

$$x_{ij} = \Sigma_{k=1}^r s_k u_{ik} v_{kj}^T$$

wherein $x_{ij}$ is the data requested, $s_k$ is part of the enabler partition, and $u_{ik} v_{kj}^T$ is part of the main partition.

* * * * *